Apr. 24, 1923.
R. J. CAMPBELL
STEAM CABINET FOR FOODS
Filed Sept. 17, 1921
1,452,907
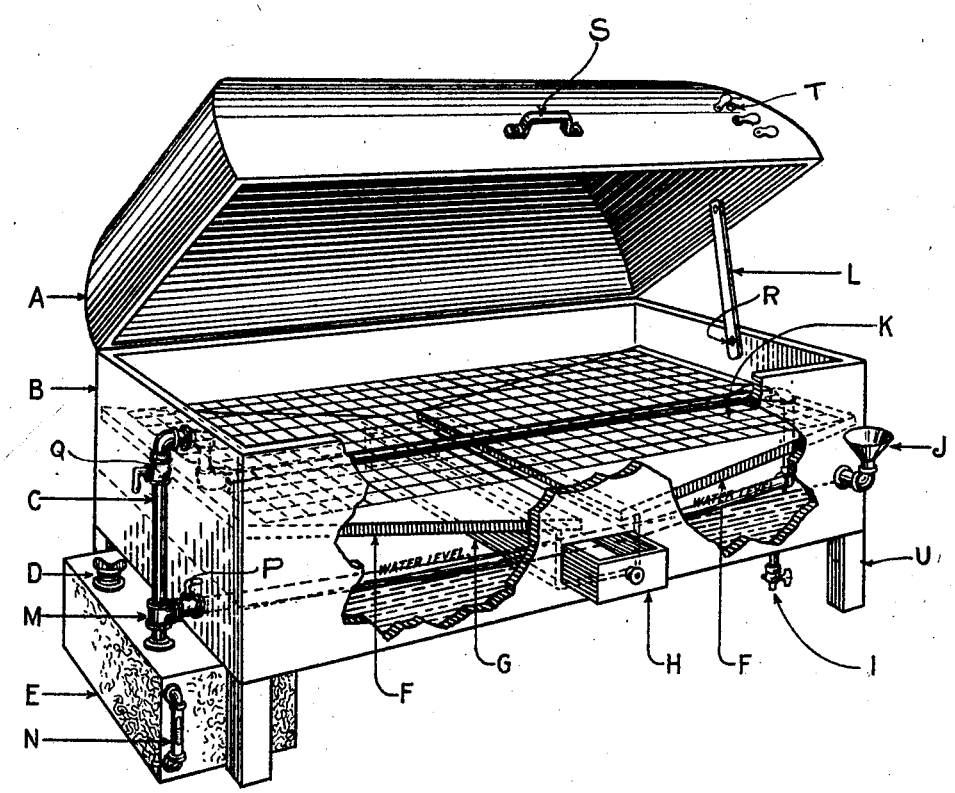
INVENTOR.
Robert Joseph Campbell
BY
ATTORNEY.

Patented Apr. 24, 1923.

1,452,907

UNITED STATES PATENT OFFICE.

ROBERT JOSEPH CAMPBELL, OF DENVER, COLORADO, ASSIGNOR TO W. HAWLEY SMITH, OF DENVER, COLORADO.

STEAM CABINET FOR FOODS.

Application filed September 17, 1921. Serial No. 501,414.

*To all whom it may concern:*

Be it known that I, ROBERT J. CAMPBELL, a citizen of the United States, residing at Denver, in the county of Denver and State of Colorado, have invented certain new and useful Improvements in Steam Cabinets for Foods, of which the following is a specification.

My invention relates to receptacles or cabinets for keeping food, such as meats and vegetables, in a tender and juicy condition, retaining the flavor after they have been cooked and to prevent them from becoming dry and tough, while waiting to be served.

One object of the invention is to provide a cabinet that is perfectly sanitary, and in which the food will be protected from flies and dust. All drippings from the food are collected and may be used for cooking and are not permitted to smear the inside of the cabinet.

The cabinet is particularly suitable for restaurants and cafes where many dishes have to be in readiness at the same time and kept until the customers are ready for them.

A cabinet about fourteen inches deep, thirty inches long and fifteen inches wide, constructed in accordance with this invention, has been found to keep the food warm and in good condition for more than two hours with only one supply of steaming hot water.

One embodiment of the invention is illustrated in the accompanying drawing, and the figure shows the cabinet in perspective view partly in section and with the lid open.

The cabinet consists of an open box B with a deep lid A hinged along one of the sides and provided with an arm L pivoted in the lid and adapted to engage a stud R in the box for keeping the lid open.

The bottom of the box is formed as a tank for water and a tray K of wiring is carried in the box above the tank and a few inches above the water level. This tray is intended to receive the dishes or plates of food and will permit all drippings to go through the same. The drippings are collected on the dripping boards F which are situated between the tank and the tray and are placed in an inclined position, their highest edges being along the short end walls of the cabinet and the lower edges in the middle thereof. A U-shaped channel G, placed transversely in the middle of the cabinet, supports the lower edges of the dripping boards F and is also adapted to receive a dripping pan H constructed in the shape of a drawer which may be taken out without opening the lid. The channel G must have tight joints with the side walls of the cabinet so that the water in the tank does not enter into it.

A short pipe with a filling funnel J is provided for filling the tank with hot water, and a drain pipe with a cock I is applied under the tank for emptying it.

The cabinet is preferably raised from the floor and four legs U are provided for this purpose.

Under the cabinet, preferably at the opposite end of the filling funnel J, a steam chest E is placed and partly extending under the tank. This chest has a filling cock D for supplying steam or boiling hot water to the chest and a T-union M connects the chest with the bottom of the cabinet and a pipe connection C enters near the top thereof. Preferably, a pipe or coil connects these two steam inlets and runs around the cabinet in any suitable manner. Preferably, a cock P is provided on the union M and another cock Q on the pipe C for regulating the flow of the steam to the cabinet.

A water gage N for indicating the amount of steam and water in the chest E is provided at one end thereof.

The lid A has a handle S for raising or lowering the same and a plurality of air holes T with suitable baffles are provided at one end of the lid.

The use of the cabinet is as follows: The tank is first filled through the funnel J without overflowing the top edges of the channel G, the drain cock I in the meantime being closed. The steam chest E is now filled through the inlet or cock D and the cocks P and Q opened. As soon as the chest has been sufficiently heated by the steam and the hot water, the food is placed on the tray K and the lid closed until some or all of the food disposed thereon is to be used.

Having thus described the invention, what is claimed as new is:

In a warming cabinet for food having a tight fitting lid, a water tank formed at the bottom of the cabinet, a perforated tray above said tank, dripping boards between said tank and said tray, said boards being inclined towards the middle of the cabinet, a dripping pan beneath the lower ends of said boards, a steam chest mounted exteriorly to the tank, a steam supply pipe from said chest provided with cocks adjacent the top and bottom of one end of the cabinet, a conduit opening into said supply pipe adjacent said cocks and having an upper horizontal portion situated above said dripping boards, and a lower horizontal portion situated below said dripping boards, whereby a complete circuit is formed by said supply pipe and said conduit for circulating steam from said chest through the cabinet.

In testimony whereof I affix my signature.

ROBERT JOSEPH CAMPBELL. [L. S.]